(12) United States Patent
Meiyappan et al.

(10) Patent No.: US 9,992,012 B2
(45) Date of Patent: Jun. 5, 2018

(54) DETECTOR

(71) Applicant: NXP B.V., Eindhoven (NL)

(72) Inventors: Adaickalavan Meiyappan, Kuala Lumpur (MY); Juhui Li, Singapore (SG); Ghiath Al-Kadi, Gratkorn (AT); Massimo Ciacci, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/267,099

(22) Filed: Sep. 15, 2016

(65) Prior Publication Data

US 2017/0078085 A1    Mar. 16, 2017

(30) Foreign Application Priority Data

Sep. 15, 2015 (EP) .................... 15185335

(51) Int. Cl.
| | | |
|---|---|---|
| H04B 3/46 | (2015.01) | |
| H04L 7/06 | (2006.01) | |
| H04L 25/03 | (2006.01) | |
| H04L 12/26 | (2006.01) | |
| H04L 25/06 | (2006.01) | |
| H04L 25/49 | (2006.01) | |
| H04L 27/06 | (2006.01) | |

(52) U.S. Cl.
CPC .......... *H04L 7/06* (2013.01); *H04L 25/03006* (2013.01); *H04L 25/06* (2013.01); *H04L 25/4923* (2013.01); *H04L 27/06* (2013.01); *H04L 43/087* (2013.01)

(58) Field of Classification Search
CPC ...................... H04L 25/03006; H04L 25/4923; H04L 27/06

USPC .......................................................... 375/226
See application file for complete search history.

(56) References Cited

U.S. PATENT DOCUMENTS

| | | | |
|---|---|---|---|
| 2011/0013685 A1* | 1/2011 | McKown | H04L 7/0029 375/232 |
| 2012/0083205 A1 | 4/2012 | Marcu et al. | |
| 2012/0147939 A1* | 6/2012 | Han | H04B 7/18589 375/224 |
| 2015/0099478 A1* | 4/2015 | Wyville | H03H 11/344 455/114.3 |

(Continued)

FOREIGN PATENT DOCUMENTS

| | | |
|---|---|---|
| EP | 1 770 898 | 4/2007 |
| EP | 2 753 038 | 7/2014 |
| WO | WO 96/35284 | 11/1996 |

OTHER PUBLICATIONS

Baek, J. H. et al. "Efficient Digital Baseline Wander Algorithm and Its Architecture for Fast Ethernet", IEEE Workshop on Signal Processing Sytems, 6 pgs (Oct. 2004).

(Continued)

*Primary Examiner* — Leila Malek

(57) ABSTRACT

A differential detector for a receiver and a method of detecting the value of symbols of a signal is disclosed. In particular, a detector comprising: an analog to digital converter for sampling samples from symbols of a signal; a differentiator configured to differentiate the samples with a transfer function to produce a differentiated series of samples for each symbol; and a decision device configured to determine the value of each symbol by comparing values of the differentiated series of samples with boundary condition values.

14 Claims, 3 Drawing Sheets

(56) References Cited

U.S. PATENT DOCUMENTS

2015/0156004 A1* 6/2015 Khandani ............ H04L 5/1423
 370/278

OTHER PUBLICATIONS

Dore, J.-B. et al. "MLSE Detector for Beyong VHBR Contactless Air Interface", IEEE International Conference on RFID-Technologies and Applications, pp. 222-227 (2012).

Extended European Search Report for Patent Appln. No. 15185335.5 (dated Jan. 20, 2016).

Ungerboeck. G. "Fractional Tap-Spacing Equalizer and Consequences for Clock Recovery in Data Modems", IEEE Transactions on Communications, vol. 24, No. 8, pp. 856-864 (Aug. 1976).

Ebadi, Z. et al. "The Application of Complex Quantized Feedback in Integrated Wireless Receivers" IEEE Transactions on Circuits and Systems—I: Regular Papers, vol. 53, No. 3, pp. 594-603 (Mar. 2006).

Yu. B. et al. "The Application of the CMA Blind Equalization in UHF RFID System", IET Conference on Wireless, Mobile and Sensor Networks, 4 pgs (Dec. 2007).

Lee, H. et al. "Differentiating ASK Demodulator for Contactless Smart Cards Supporting VHBR", IEEE Transactions on Circuits and Systems—II: Express Briefs, vol. 62, No. 7, pp. 641-645 (Jul. 2015).

"Identification cards—Contactless integrated circuit(s) cards—Proximity cards—Part 2: Radio frequency power and signal interface", ISO/IEC 1443-2, 15 pgs, (Mar. 26, 1999).

* cited by examiner

DETECTOR

CROSS-REFERENCE TO RELATED APPLICATIONS

This application claims the priority under 35 U.S.C. § 119 of European patent application no. 15185335.5, filed on Sep. 15, 2015, the contents of which are incorporated by reference herein.

FIELD

The present disclosure relates to a detector and a method of detecting values of a signal. In particular, the disclosure relates to a differential detector for a receiver.

BACKGROUND

Amplitude shift keying (ASK) is a signaling method where the message is encoded in the amplitude of the transmitted waveform. A typical ASK receiver includes a receiving antenna followed by an analog front-end (AFE) which down-converts the wireless signal from the receiving antenna by extracting the signal envelope. The signal envelope is quantized into discrete values using an analog-to-digital converter (ADC) for further digital signal processing (DSP) since the received signal suffers from various non-idealities.

Examples of non-idealities include the following:
i) Phase jitter during modulation at the transmitter (a bounded time-offset uncertainty on the symbol transition time grid), which causes a time-varying deviation of the transmitted symbol period, manifesting as shifted rising and falling edges of symbols of a signal from their nominal positions.
ii) Bandwidth limited wireless channel introduces inter-symbol interference (ISI) into the received signal. ISI increases with the transmission data rate, when the data rate exceeds the available channel bandwidth.
iii) Channels and the AFE can induce time-varying gain for each signal constellation point, which makes symbol detection difficult at the receiver.
iv) A high-pass filter effect arising from ac coupling and/or a power regulator in the AFE at the receiver, which suppresses low-frequency components to cause baseline wander in the received signal.

These signal distortions necessitate DSP at the receiver to reliably recover the transmitted message without incurring symbol errors.

Traditionally, transversal, lattice, or block adaptive equalizers have been used to compensate for ISI and time-varying signal gain. However, in burst communications and in constrained frame formats with few or no training symbols, the equalizers may not be adequately trained. Consequently, the use of an equalizer with non-converged filter weights will yield a large residual ISI. Blind equalizers are an attractive alternative but their convergence time is generally long (in the order of several thousand symbols), making them unsuitable for burst communications.

Phase jitter can be combated using fractionally-spaced equalization. Unfortunately, for the same reasons described above, a poorly converged equalizer is of little use in compensating phase jitter in burst communications.

In the literature, use of decision feedback equalizers and of low-pass filtered symbol decisions to restore the low-frequency components in the ADC's digitized signal output has been suggested to overcome baseline wander. However, these methods have increased computational complexity making them unsuitable for hardware implementation. Moreover, the equalizer based method would need increased filter length and training period, whereas difficult manual tuning of parameters is required in designing the low-pass filter used to restore the low-frequency components.

SUMMARY

According to a first aspect of the present disclosure, there is provided a differential detector for a receiver, said detector comprising: an analog to digital converter for sampling samples from symbols of a signal; a differentiator configured to differentiate the samples with a transfer function to produce a differentiated series of samples for each symbol; and a decision device configured to determine the value of each symbol by comparing values of the differentiated series of samples with boundary condition values.

Comparing values of the differentiated series of samples with boundary condition values may mitigate issues relating to non-idealities such as 151, phase jitter or other signal distortions in received signals.

In embodiments, the analog to digital converter may sample each symbol with L samples per symbol, where L is greater than or equal to 2.

In other embodiments, the detector may assign a ternary value to a symbol of either: +1 to a symbol if a value of the differentiated series of samples for that symbol exceeds an upper boundary condition value; or −1 to a symbol if a value of the differentiated series of samples for that symbol exceeds a lower boundary condition value; or 0 to a symbol if neither the upper nor lower boundary condition values are exceeded by the differentiated series of samples. Additionally, the decision device may determine the value of a symbol based on the sum of the ternary value of a symbol and the value of its preceding symbol.

Additionally or alternatively, the boundary condition values may be adaptive and may be adapted for each symbol. The detector may also either: adapt the upper boundary condition value of a symbol if the ternary value of its preceding symbol is +1; or adapt the lower boundary condition value of a symbol if the ternary value of its preceding symbol is −1; or maintain the upper and lower boundary condition values of a symbol if the ternary value its preceding symbol is 0.

In embodiments, for each symbol either: a positive sequence may be assigned or maintained for a symbol where at least one sample of its differentiated series of samples exceeds an upper boundary condition value; or a negative sequence may be assigned or maintained for a symbol where at least one sample of its differentiated series of samples exceeds a lower boundary condition value; or a positive or negative sequence may be maintained for a symbol where no sample of its differentiated series of samples exceed the upper or lower boundary condition value. Additionally, the decision device may determine ternary values of each symbol within each positive or negative sequence of symbols. Furthermore, the symbol with the sample that exceeded the boundary condition value by the greatest amount for each sequence may be assigned a ternary value of +1 for a positive sequence or −1 for a negative sequence. Every remaining symbol in a sequence may be assigned a ternary value of 0.

In embodiments, the ternary values of the final sequence of symbols may be assigned a value of 0 if the sum of the ternary values of all the symbols differ from a predetermined sum of expected ternary values. For example, from a priori knowledge of the signal frame, an expected outcome of the sum of the ternary values can be determined. For example, if it is expected that the sum of all ternary symbols yields a 1, but the actual sum equals 0, then the final sequence of symbols may be assigned (i.e., reset) a value of 0. This knowledge can be determined by analysing the values of the signal at the start and end of the signal frame.

In embodiments, the decision device may determine the value of a symbol based on the integral of the ternary value of a symbol.

In other embodiments, the detector may further comprise a symbol synchroniser for retrieving a symbol timing for each symbol.

The transfer function may be $h=[0_a \ 1 \ 0_b \ -c]$.

According to a second aspect of the present disclosure, there is provided a method of detecting the value of symbols of a signal, said method comprising the steps of: sampling samples from symbols of a signal; differentiating the samples with a transfer function to produce a differentiated series of samples for each symbol; determining the value of each symbol by comparing values of the differentiated series of samples with boundary condition values.

It is an object to provide a robust low-complexity, multiplier-free, DSP algorithm to decode a received signal impaired by ISI, time-varying signal gain, phase jitter, and baseline wander, without utilizing any training sequence.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), flash memory, or a chip as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the disclosure will be apparent from, and elucidated with reference to, the embodiments described hereinafter.

BRIEF DESCRIPTION OF DRAWINGS

Embodiments will be described, by way of example only, with reference to the drawings, in which

FIG. 4b shows a differentiated signal of FIG. 4a; and

Figure 1:
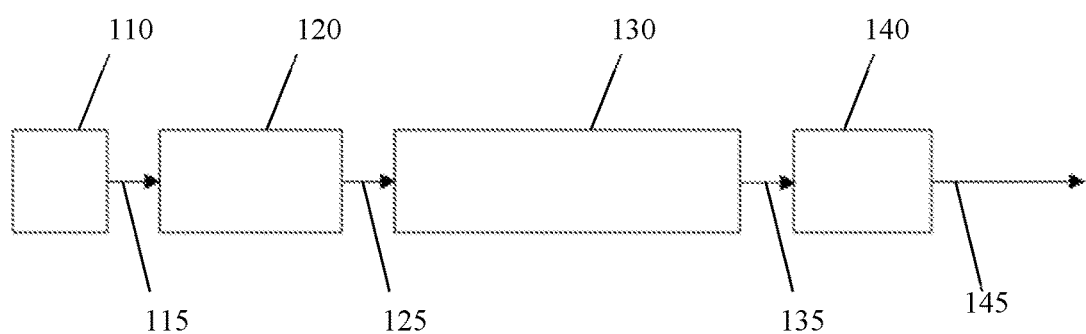
FIG. 1 shows a detector with several DSP blocks according to an embodiment of the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

An example of a detector according to an example of the present disclosure is shown in FIG. 1. FIG. 1 shows several DSP blocks of an ASK signal receiver 100, namely, an ADC 110 operating at a higher rate than the baud rate (i.e., an oversampled ADC), a differentiator 130, and a decision device 140. The overall DSP path typically comprises an ADC 110, a symbol synchronizer 120, a differentiator 130, and a decision device 140.

The ADC 110, differentiator 130, and decision device 140 will be explained in depth, whereas the generic symbol synchronizer block 120 will be briefly described, in the following.

ADC

Consider the transmission of a binary ASK signal, with a non-return-to-zero (NRZ) pulse shape given by s(t). Let the ADC's 110 sample output 115 at time k be u(k). Let q refer to the symbol index which is related to the original sample time k as $$k=qL+i, \ i=0,1,\ldots,L-1 \ q=0,1,2,\ldots \quad (1)$$

where L is the number of samples per symbol. Here, L is greater than or equal to 2 samples per symbol. To aid the initialization of the decision device 140, let $u(k)=\delta$ for time $k \leq -1$, where $\delta$ is the average of the binary ASK signal levels of '1' and '0'.

Symbol Synchronizer

The symbol synchronizer 120 functions to retrieve the symbol timing 125 of the signal output 115 at the beginning of the communication period. For example, symbol synchronizer 120 could be implemented using early-late sampling, which adjusts the symbol time towards the local peak time of correlator output $v(k)=s(k)*u(k)$, where * represents convolution.

Differentiator

Figure 2A:
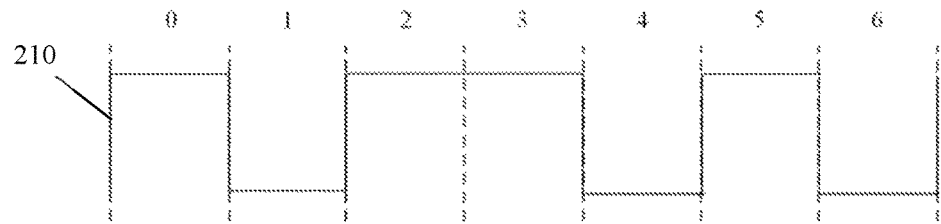
FIG. 2a shows an example of a continuous binary ASK signal without baseline wander according to an embodiment being processed by a differentiator block of FIG. 1.
Figure 2B:
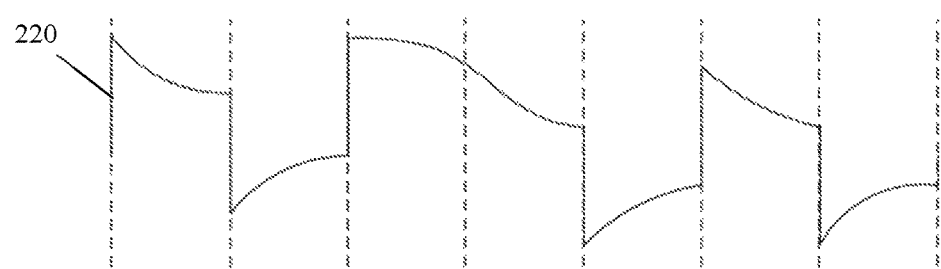
FIG. 2b shows an example of a continuous binary ASK signal with baseline wander being processed by a differentiator block of FIG. 1

A differentiator 130 with transfer function $h=[0_a \ 1 \ 0_b \ -c]$ is introduced, where $0<c\leq1$, $0_i$ is a row vector of zeros of length i. Here, $b\in\{0, 1, \ldots, L-1\}$ and $a\in\{0, 1, \ldots, L-b-1\}$. FIGS. 2(a) and 2(b) illustrate an example of a binary ASK 7-symbols long signal without and with baseline wander, respectively. In FIG. 2(a), an ideal binary signal 210 varies between 0 and 1. In FIG. 2(b), the same signal is shown, but with baseline wander. The baseline wander binary signal 220 has evidence of exponential decay of the binary signal, such that the value of the signal in symbol 5 is notably lower than in symbol 0.

Figure 2C:
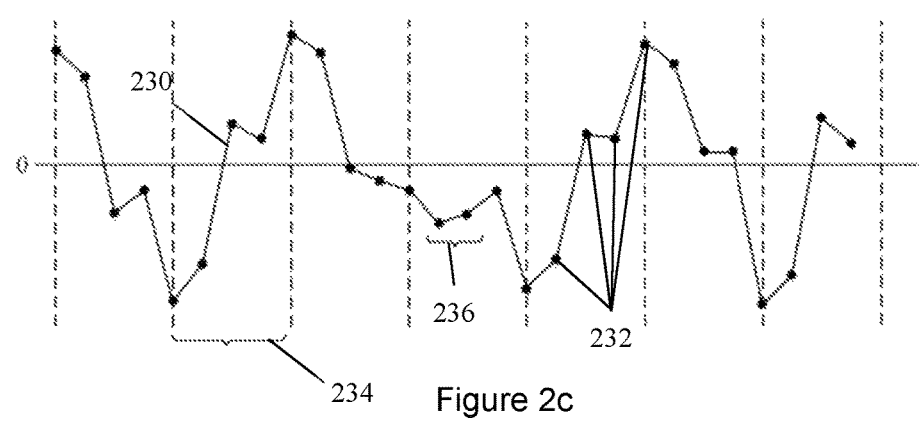
FIG. 2c shows an example of a sampled and differentiated signal of FIG. 2b.
Figure 2D:
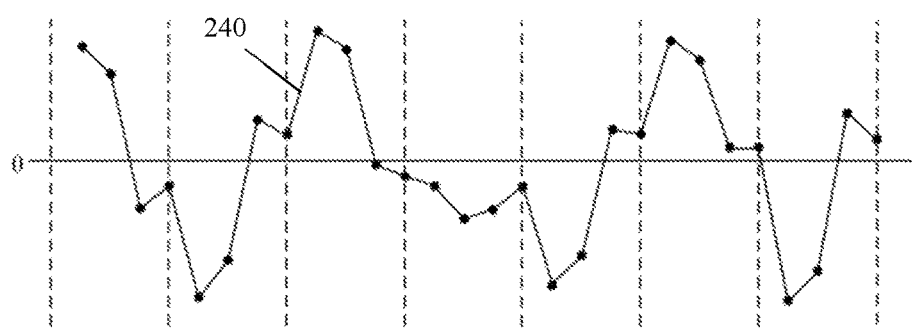
FIG. 2d shows an example of a sampled and differentiated signal of FIG. 2b, with an additional differential shift.

Differentiating an ASK signal having baseline wander 220, mitigates the baseline wander effect by converting the signal into a ternary ASK signal 230 with levels '1', '0', and '−1' as illustrated by example FIG. 2(c). In FIG. 2(c), the ASK signal having baseline wander 220 of FIG. 2(b) is sampled at L=4 (providing four points 232 per symbol or observation window 234) and differentiated using a=0, b=1, and c=−1. Differentiating the baseline wander signal 220 maintains an indication of how the signal changes whilst mitigating the effects of baseline wander and other degradation signal effects.

An undesirable byproduct of the differentiator h used in FIG. 2(*c*), is the creation of false local maxima and minima which can be misinterpreted as levels '1' and '−1', respectively. An example of a false local minimum is depicted in FIG. 2(*c*) at 236. Careful selection of the value of c can minimize the strength of false peaks, but difficult time-consuming manual tuning of c would be needed. To avoid the need for any manual tuning, c can be set to −1 and potential erroneous decisions due to false peaks will be avoided by the decision device as described later.

Symbol timing errors and dispersed symbol pulse due to ISI lead to symbol decision errors. A value of b∈{0, 1, . . . , L−2}, compared to b=L−1, in the differentiator h is seen to create a narrower symbol pulse, and ISI tail. Hence, using b∈{0, 1, . . . , L−2} more accurately defines the arrival of a symbol pulse and its time location with respect to the symbol observation windows. This improved accuracy enhances the symbol detection process in the decision device later. An example depicting the creation of narrower symbol pulse is shown in FIG. 2(*c*), where b=1.

Poor symbol timing due to phase jitter and ISI-degraded symbol synchronization, is further guarded against by assigning a non-zero value to a. A non-zero a, essentially controlling the signal delay with respect to symbol observation window, ensures the narrow differentiated symbol pulse lie centered within each symbol observation window. Therefore, it provides the highest probability of correct symbol pulse detection within the correct symbol observation window. FIG. 2(*d*) illustrates an ASK signal 240 having baseline wander which is sampled and differentiated using a=1, b=1, c=−1, and L=4. As can be seen, the ternary symbol sequence in FIG. 2(*d*), shifted by 1/L points due to a=1 in the transfer function, compared to that in FIG. 2(*c*), with a=0, is clearer for decoding.

Initial oversampling by the ADC 110 at L≥2 is an important factor to realize the benefits offered by the differentiator h, namely, mitigating the effect of ISI and phase jitter.

Decision Device

Finally, a decision device 140 functions to reliably detect the received symbols 135 from the differentiator 130 even in the presence of ISI, time-varying gain, baseline wander, and phase jitter. Input samples 135 to the decision device 140 are denoted by y(k). The samples {y(k)} corresponding to symbol q are defined by the set $$y(qL)=[y(qL+L-1) \ldots y(qL)]. \quad (2)$$

The decision device in FIG. 1 may be realized via two different methods, namely, a symbol-by-symbol detector or a sequence detector, which are presented next.

Symbol-by-Symbol Detector

Figure 3:
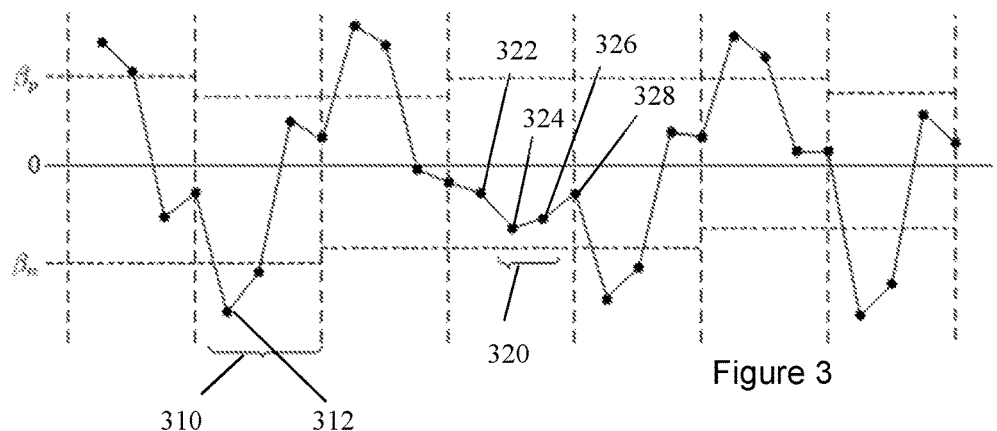
FIG. 3 shows a symbol-by-symbol detector utilizing ternary slicer with adaptive decision boundaries for the signal of FIG. 2d.

Considering the output 135 of the differentiator 130 illustrated in FIG. 2(*d*), the decision device 140 could be implemented as a symbol-by-symbol detector having a ternary slicer. Such an approach is shown in FIG. 3. A soft ternary symbol decision $\hat{m}(q)$ is assigned to each symbol q according to the decision metric of $$\hat{m}(q) = \begin{cases} 1 & \text{if } \max(y(qL)) > \beta_p \\ -1 & \text{if } \min(y(qL)) < \beta_n \\ 0 & \text{otherwise} \end{cases} \quad (3)$$

where $\beta_p$ and $\beta_n$ are the decision boundaries in a ternary signal constellation. In the decision metric of (3), a soft ternary decision of '1' and '1' is assigned when a local maximum and local minimum is detected, respectively, otherwise a soft ternary decision of '0' is assigned by default due to the absence of a symbol pulse. For example, in symbol 1, shown at 310 (corresponding to the signal shown in FIG. 2(*d*), the first sample 312 exceeds the lower threshold value $\beta_n$ and therefore a −1 is assigned to that symbol.

Firm binary decision m(q) 145 on the received symbol q is obtained by integrating the soft ternary decisions $\hat{m}(q)$ as $$m(q) = m(0) + \sum_{l=1}^{q} \hat{m}(l) \quad (4)$$
$$= \hat{m}(q) + m(q-1),$$
$$q = 1, 2, \ldots$$

where m(0)=0 and m(0)=1 if $\hat{m}(0)$=−1 and $\hat{m}(0)$=1, respectively.

To enhance the symbol-by-symbol detector's tolerance to time-varying gain and asymmetric waveform (i.e., ternary symbol '1' and '−1' with unequal magnitude), the decision boundaries $\beta_p$ and $\beta_n$ are adapted upon every detection of '1' and '−1' ternary symbols as $$\beta_p = 2^{-\theta_1} \times \max(y(qL)), \text{ if } \hat{m}(q)=1$$

$$\beta_n = 2^{-\theta_2} \times \min(y(qL)), \text{ if } \hat{m}(q)=-1$$

$$\beta_p = \beta_p \text{ and } \beta_n = \beta_n, \text{ otherwise} \quad (5)$$

where $\theta_1$ and $\theta_2$ are positive real numbers. Ensuring $\theta_1$ and $\theta_2$ to be integers, removes multiplication operations from (5) since multiplication by factors of $2^{-i}$, where i is an integer, can be implemented as bitshift operations. FIG. 3 depicts the independent adaptation of each decision boundary by the symbol-by-symbol detector while decoding a differentiated ASK signal. This ensures that the 'false minima' at point 320 is correctly interpreted as a 0 ternary decision as none of the samples 322, 324, 326, 328 exceed the boundary conditions.

Use of independent decision boundaries $\beta_p$ and $\beta_n$ for detection of ternary symbol '1' and '−1' enables improved decoding of asymmetric waveforms. Moreover, continuous update of decision boundaries $\beta_p$ and $\beta_n$ based on the observed signal samples allow the detector to track time-varying gain of the signal.

However, the symbol-by-symbol detector requires difficult, time-consuming, optimization of initial $\beta_p$, $\beta_n$, $\theta_1$, and $\theta_2$ values by trial-and-error. Careful selection of initial $\beta_p$, $\beta_n$, $\theta_1$, and $\theta_2$ values is crucial to satisfy the competing demands of (i) sufficiently large decision boundaries to avoid detection of false local maxima or minima created by the differentiator block and to avoid detection of additive noise, and (ii) sufficiently small decision boundaries to avoid missing any true local maxima or minima representing true ternary symbols '1' and '−1'.

Sequence Detector

To overcome the parameter optimization difficulties of the symbol-by-symbol detector, the decision device 140 may alternatively be realized as a sequence detector which operates on a set-and-forget mode with no tuning of parameters needed. By utilizing neighboring (i.e. before and after) symbols, the sequence detector is able to make better symbol decisions and thus tolerate greater ISI than the symbol-by-symbol detector. The sequence detector by virtue of its construction is capable of decoding signals impaired with large ISI and time-varying signal gain, which is explained in detail next.

In the differentiated ASK signal, occurrence of any two '1' symbols is separated by the presence of one '−1' symbol in between. In other words, ternary symbol sequences such as [ . . . 1 0 1 . . . ] and [ . . . 1 1 . . . ] do not arise. This principle applies likewise to the occurrence of any two '−1' symbols in the differentiated ASK signal. Given this concept, the input symbols to the sequence detector are assigned to either a positive sequence P or a negative sequence N, according to the rule given in Table 1. For initialization, symbol q=−1 is assigned to a negative sequence and min (y(−L))=−γ. Here, γ represents a small constant positive value to avoid additive noise.

TABLE 1

Rules for assignment of symbols to positive and negative sequences

| When symbol q − 1 | If symbol q satisfies | Then, assign symbol q to |
|---|---|---|
| a) belongs to positive seq, P & <br> b) max (y(qL − L)) ≥ γ | a) y(qL + i) > max (y(qL − L)) & <br> b) y(qL + j) > −γ <br> for i ∈ {0, 1, . . . , L −1}, j = 0, 1, . . . , i | positive sequence, P |
| | a) y(qL + i) ≤ −γ & <br> b) y(qL + j) ≤ max (y(qL − L)) <br> for i ∈ {0, 1, . . . , L − 1}, j = 0, 1, . . . , i | negative sequence, N |
| | otherwise | preceding sequence |
| a) belongs to negative seq, N & <br> b) min (y(qL − L)) ≥ −γ | a) y(qL + i) < min (y(qL − L)) & <br> b) y(qL + j) < γ <br> for i ∈ {0, 1 , . . . , L − 1}, j = 0, 1, . . . , i | negative sequence, N |
| | a) y(qL + i) ≥ γ & <br> b) y(qL + j) ≥ min (y(qL − L)) <br> for i ∈ {0, 1, . . . , L − 1}, j = 0, 1, . . . , i | positive sequence, P |
| | otherwise | preceding sequence |
| satisfies \|y(qL − L)\| < γ | a) y(qL + i) ≥ γ & <br> b) y(qL + j) > −γ <br> for i ∈ {0, 1, . . . , L − 1}, j = 0, 1, . . . , i | positive sequence, P |
| | a) y(qL + i) ≤ −γ & <br> b) y(qL + j) < γ <br> for i ∈ {0, 1, . . . , L − 1}, j = 0, 1, . . . , i | negative sequence, N |
| | otherwise | preceding sequence |

At the beginning of the input signal y(k), the sequence detector attempts to detect the presence of either a positive or a negative sequence. Assume a positive sequence P, comprising symbol indices q=$p_{start}$, . . . , $p_{end}$, is detected. The symbol $q_p$ satisfying $$q_p = \max_{p_{start} \leq q \leq p_{end}} \left( \max_{0 \leq i \leq L-1} y(qL + i) \right) \quad (6)$$

and $$\max(y(q_p L)) \geq \gamma \quad (7)$$

within sequence P is assigned a soft ternary decision $\hat{m}$ ($q_p$)=1 while other symbols within sequence P are assigned soft ternary decisions of '0'. The symbol index $q_p$ which contains the maximum value, exceeding boundary γ, of sequence P is decided upon as ternary '1' based on maximum likelihood principle where likelihood of y(qL) being a true ternary '1' symbol increases with its value.

Next, the sequence detector proceeds to detect a negative sequence N, since positive and negative sequences alternate in a differentiated ASK signal. Let the symbol indices in the negative sequence be q=$n_{start}$, . . . , $n_{end}$. The symbol $q_n$ satisfying $$q_n = \min_{n_{start} \leq q \leq n_{end}} \left( \min_{0 \leq i \leq L-1} y(qL + i) \right) \quad (8)$$

and $$\min(y(q_n n)) \leq -\gamma \quad (9)$$

within sequence N is assigned a soft ternary decision of $\hat{m}(q_n)$=−1 while other symbols within sequence N are assigned soft decisions of '0'. Subsequent soft ternary decisions of the sequence detector are made by alternating between positive and negative sequences.

The following supplementary decision rule is adopted to mitigate false detection of additional ternary '1' or '−1' symbol toward the end of the signal, if the received signal is formatted in frames and the receiver has knowledge of the frame protocol. This supplementary rule is based on the running sum of soft ternary decisions $\hat{m}$, which should be bounded in [0,1] by virtue of the transmitted signal being a binary ASK signal. If ideally Σ$\hat{m}$(q)=0 but Σ$\hat{m}$(q)=α in the received frame, then the last ternary α symbol in the frame is reset to soft ternary '0' symbol. Here, α∈{1, −1}. If ideally Σ$\hat{m}$(q)=α but Σ$\hat{m}$(q)=0 in the received frame, then the last ternary −α symbol in the frame is reset to soft ternary '0' symbol.

A firm binary decision m(q) on the received symbol q is obtained as described by (4).

Notably, the sequence detector avoids the need for any decision slice levels and simultaneously avoids detection of false local maxima or minima created previously by the differentiator h because true local maxima or minima will be of greater magnitude than false maxima or minima. Moreover, sequence detection enables reliable decoding of signals with time-varying gain since decisions are based on selecting symbols containing the maximum or minimum value within a positive or a negative sequence and not based on any externally-set hard decision boundaries. Furthermore, the sequence detector does not require any multiplier hardware in its operation.

Figure 4A:
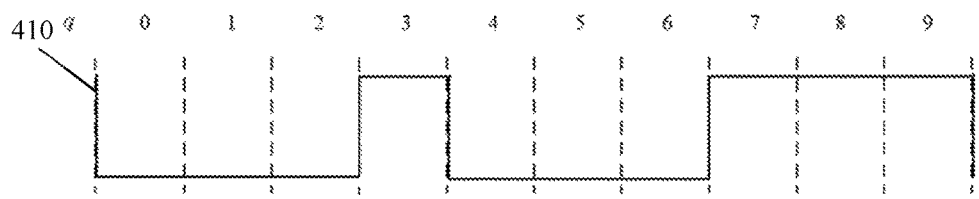
FIG. 4a shows an ideal binary ASK signal according to an alternative embodiment.
Figure 4B:
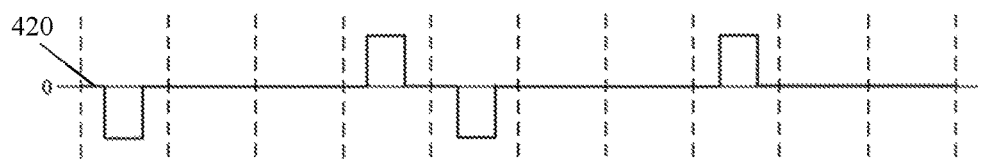
Figure 4C:
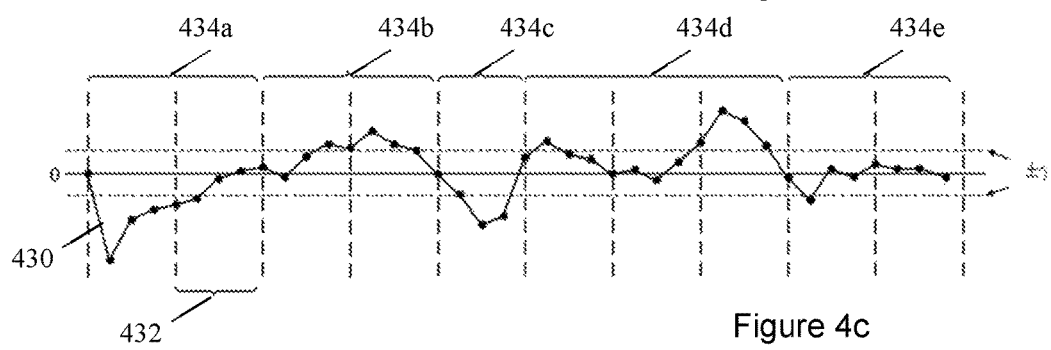
FIG. 4c shows a sampled and differentiated input signal having nonidealities.

FIG. 4(a), FIG. 4(b), and FIG. 4(c) illustrate an example of an ASK signal, its differentiated version using h=[0 1 0

−1] for L=4, and the corresponding nonidealities-impaired input signal y(k) to the sequence detector, respectively. Assume the example in FIG. 4 adheres to a frame format of length 10 and ideally $\Sigma\hat{m}(q)=0$.

As shown in FIG. 4(a), the idealized signal 410 has value 0 for symbols 0 to 2 (from an initial value of 1), value 1 for symbol 3, value 0 for symbols 4 to 6 and value 1 for symbols 7 to 9.

FIG. 4(b) shows a narrowed, shifted, differentiated signal 420 of the ideal signal 410 of FIG. 4(a). Peaks in observation windows 0, 3, 4 and 7 correspond to changes in the value of the signal 410 in the symbol identified and the preceding symbol.

FIG. 4(c) shows the actual signal 430 of FIG. 4(b), with non-idealities and 4 samples per symbol.

Initially, the sequence detector makes soft ternary decisions for each symbol 432 in FIG. 4(c) as $$\hat{m} = [\hat{m}(0) \dots \hat{m}(9)] \quad (10)$$
$$= [-1\ 0\ 0\ 1\ -1\ 0\ 0\ 1\ -1\ 0]$$

This sequence is determined by analyzing the signal 430 and identifying sequences 434a-e that correspond to groups of symbols with one or more sample either exceeding a boundary condition or where all samples fall within the boundary conditions. Analyzing the signal 430 yields: negative sequence 434a, positive sequence 434b, negative 434c, positive 434d and negative 434e. Each sequence 434a-e is then analyzed to determine the symbol with the highest value sample. This symbol is then designated with a ternary value corresponding to its sequence value (so symbol 0 is assigned −1 for sequence 434a, and symbols 3, 4, 7 and 8 are assigned +1, −1, +1 and −1 for sequences 434b-e). Every remaining symbol in a sequence is assigned a ternary value of 0. This corresponds to (10).

Since the initial symbol decision sequence yields $\Sigma_{l=0}^{9}\hat{m}(l)=-1$, the last ternary '−1' symbol is reset to ternary '0' symbol according to the supplementary rule described above. Hence, the final ternary decisions of the sequence detector are $\hat{m}=[-1\ 0\ 0\ 1\ -1\ 0\ 0\ 1\ 0\ 0]$. Integrating $\hat{m}$ firm binary decisions for the frame are obtained as $$m = [m(0) \dots m(9)] \quad (11)$$
$$= [0\ 0\ 0\ 1\ 0\ 0\ 0\ 1\ 1\ 1],$$

which is verified correct by comparing with FIG. 4(a).

Complexity increase due to the proposed sequence detector block only involves several additional registers to store past input y(k) values, unlike the exponential increase of complexity with sequence length in maximum likelihood sequence estimation (MLSE). Moreover, MLSE requires a channel estimator in the presence of ISI and time-varying signal gain. A poor channel estimation in burst communication and signaling with little or no training sequence, effectively renders the MLSE worse off compared to the proposed sequence detector which is robust against large residual ISI and time-varying gain even without a channel estimator.

The combination of oversampled ADC 110, differentiator 130, and decision device 140 (i.e., symbol-by-symbol detector or sequence detector) blocks may be utilized in the receiver baseband DSP structure of the passive integrated circuit card (PICC) or contactless smartcard for Type-B ASK radio-frequency identification (RFID) systems at a carrier of 13.56 MHz, as defined by ISO 14443. In ASK NFC (near field communication), the frame format may lack explicit training sequence which makes the disclosure advantageous for application in the receiver of contactless smartcards. The individual character format with start bit, stop bit, and $\Sigma\hat{m}(q)=0$ in ASK NFC is known apriori to the receiver. Hence, the decision device implemented as a sequence detector may make character-by-character decisions while adopting the supplementary decision rule. The disclosure, having low-complexity, multiplier-free, real-time operation capability, endears itself to the receiver baseband DSP in contactless smartcard since contactless smartcards are passive devices favoring low-power algorithms.

From reading the present disclosure, other variations and modifications will be apparent to the skilled person. Such variations and modifications may involve equivalent and other features which are already known in the art of receivers and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A differential detector for a receiver, said differential detector comprising:
    an analog to digital converter for sampling symbols of a signal to produce samples;
    a differentiator configured to differentiate the samples with a transfer function to produce a differentiated series of samples for each symbol; and
    a decision device configured to determine the value of each symbol by comparing values of the differentiated series of samples with boundary condition values;
    wherein the differential detector assigns a ternary value of either:
    i) +1 to a symbol if a value of the differentiated series of samples for that symbol exceeds an upper boundary condition value; or
    ii) −1 to a symbol if a value of the differentiated series of samples for that symbol exceeds a lower boundary condition value; or
    iii) 0 to a symbol if neither the upper nor lower boundary condition values are exceeded by the differentiated series of samples;

wherein the boundary condition values are adaptive and are adapted for each symbol;
wherein the differential detector either:
a) adapts the upper boundary condition value of a symbol if the ternary value of its preceding symbol is +1; or
b) adapts the lower boundary condition value of a symbol if the ternary value of its preceding symbol is −1; or
c) maintains the upper and lower boundary condition values of a symbol if the ternary value of its preceding symbol is 0.

2. The differential detector according to claim 1, wherein the analog to digital converter samples each symbol with L samples per symbol, where L is an integer equal to or greater than 2.

3. The differential detector according to claim 1, wherein the decision device determines the value of a symbol based on the sum of the ternary value of a symbol and the value of its preceding symbol.

4. The differential detector according to claim 1, further comprising a symbol synchroniser for retrieving a symbol timing for each symbol.

5. The differential detector according to claim 1, wherein the transfer function is h=[$0_a$ 1 $0_b$ −c], where 0<c≤1, $0_i$ is a row vector of zeros of length i, where b is an element of {0, 1, . . . , L−b−1}, where L is an integer equal to or greater than 2 and a is an element of {0, 1, . . . , L−b−1}.

6. A differential detector for a receiver, said differential detector comprising:
an analog to digital converter for sampling symbols of a signal to produce samples;
a differentiator configured to differentiate the samples with a transfer function to produce a differentiated series of samples for each symbol; and
a decision device configured to determine the value of each symbol by comparing values of the differentiated series of samples with boundary condition values;
wherein for each symbol either:
a positive sequence is assigned to or maintained for a symbol where at least one sample of its differentiated series of samples exceeds an upper boundary condition value; or
a negative sequence is assigned to or maintained for a symbol where at least one sample of its differentiated series of samples exceeds a lower boundary condition value; or
a positive or negative sequence is maintained for a symbol where no sample of its differentiated series of samples exceed the upper or lower boundary condition value;
wherein the decision device determines ternary values of each symbol within each positive or negative sequence of symbols;
wherein the ternary values of the final sequence of symbols are assigned a value of 0 if the sum of the ternary values of all the symbols differ from a predetermined sum of expected ternary values.

7. The differential detector according to claim 6, wherein the analog to digital converter samples each symbol with L samples per symbol, where L is an integer equal to or greater than 2.

8. The differential detector according to claim 6, wherein the symbol with the sample that exceeded the boundary condition value by the greatest amount for each sequence is assigned a ternary value of +1 for a positive sequence or −1 for a negative sequence.

9. The differential detector according to claim 8, wherein every remaining symbol in a sequence is assigned a ternary value of 0.

10. The differential detector according to claim 8, wherein the decision device determines the value of a symbol based on the integral of the ternary value of a symbol.

11. A differential detector for a receiver, said differential detector comprising:
an analog to digital converter for sampling symbols of a signal to produce samples;
a differentiator configured to differentiate the samples with a transfer function to produce a differentiated series of samples for each symbol; and
a decision device configured to determine the value of each symbol by comparing values of the differentiated series of samples with boundary condition values;
wherein for each symbol either:
a positive sequence is assigned to or maintained for a symbol where at least one sample of its differentiated series of samples exceeds an upper boundary condition value; or
a negative sequence is assigned to or maintained for a symbol where at least one sample of its differentiated series of samples exceeds a lower boundary condition value; or
a positive or negative sequence is maintained for a symbol where no sample of its differentiated series of samples exceed the upper or lower boundary condition value;
wherein the decision device determines ternary values of each symbol within each positive or negative sequence of symbols;
wherein the symbol with the sample that exceeded the boundary condition value by the greatest amount for each sequence is assigned a ternary value of +1 for a positive sequence or −1 for a negative sequence;
wherein the decision device determines the value of a symbol based on the integral of the ternary value of a symbol.

12. The differential detector according to claim 11, wherein the analog to digital converter samples each symbol with L samples per symbol, where L is an integer equal to or greater than 2.

13. The differential detector according to claim 11, wherein every remaining symbol in a sequence is assigned a ternary value of 0.

14. The differential detector according to claim 11, wherein the ternary values of the final sequence of symbols are assigned a value of 0 if the sum of the ternary values of all the symbols differ from a predetermined sum of expected ternary values.

* * * * *